Oct. 22, 1946.  O. W. HOSKING  2,409,759
DIRECT BONDING OF RUBBER TO METAL
Filed Sept. 13, 1941
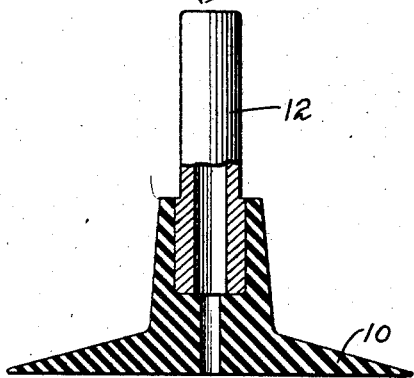
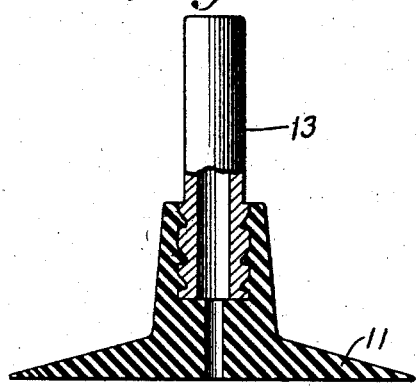
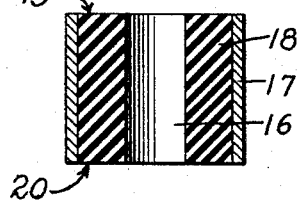
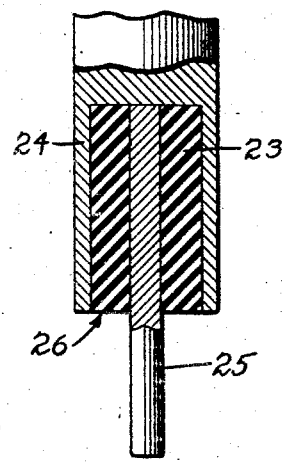
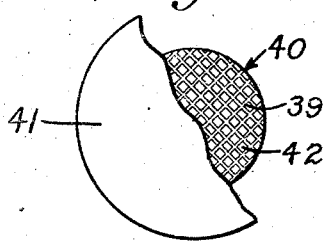
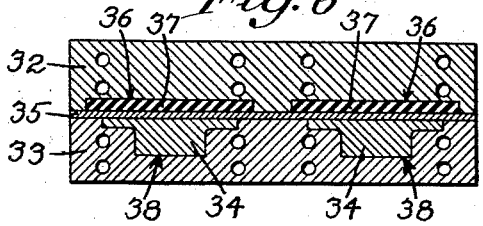
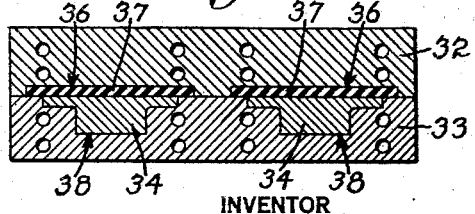
INVENTOR
Oakley W. Hosking
BY Johnson, Kline & Smyth
ATTORNEYS Patented Oct. 22, 1946

2,409,759

UNITED STATES PATENT OFFICE 2,409,759

DIRECT BONDING OF RUBBER TO METAL

Oakley W. Hosking, Monroe, N. Y., assignor to Composite Rubber Products Corporation, Bridgeport, Conn., a corporation of Connecticut Application September 13, 1941, Serial No. 410,696

17 Claims. (Cl. 154—130)

This invention relates to the art of bonding rubber to metal, and to a process for the production of composite rubber-metal articles wherein rubber or a rubber-like substance is securely bonded directly to a metal surface.

More specifically, the invention relates to a process for producing rubber-metal articles, wherein a rubber or rubber-like substance is premolded or preformed, then assembled with the metal piece to which it is to be directly bonded, and then subjected to a treatment for effecting direct bonding of the rubber to the metal.

The invention especially relates to processes of the aforesaid type, in which a rubber composition, adapted to be bonded directly to a metal piece is prevulcanized, either partially or completely, and subsequently bonded directly to a piece of rubber-adherent metal.

The present application is a continuation in part of my copending application, Serial No. 234,616, filed October 12, 1938, now Patent No. 2,337,555, granted December 28, 1943, and of my copending application Serial No. 352,578, filed August 4, 1940.

It has long been a desideratum in the art to form a strong and lasting bond between rubber and metal pieces so that the rubber and metal would remain united in firm and fast relationship and resist mechanical forces, such as a force tending to pull the rubber and metal apart, or torsion tending to twist the rubber from the metal.

It has been attempted heretofore to produce rubber and metal articles wherein the rubber is bonded to a metal surface by vulcanizing the rubber in direct contact with said metal surface. Many proposals have been made heretofore for accomplishing this result in this manner, but so far as I am aware, none of these proposals, where the metal and rubber are to be secured together by direct contact between the metal and the rubber, have produced satisfactory results. The bond produced is of relatively inferior strength, and upon subjecting the article to stresses tending to tear the rubber away from the metal, separation occurs at the bond.

Moreover, in general, the strength of the bond produced according to such prior art processes was variable and could not be controlled. The resulting unreliability of the rubber and metal articles was especially disadvantageous since in general it is impossible to test the finished articles to the point of failure of the bond in order to determine whether the articles would withstand the strains to which they were to be subjected in use.

Fair results have been obtained by applying adhesives, tie gums or cements to certain materials including metals, and then vulcanizing or otherwise securing the rubber substance thereto. The use of such tie gums and cements usually provides a more uniform degree of adhesion, but, in general, the layer of cement is of considerably lower tensile strength than the rubber and accordingly, such methods were not capable of producing a sufficient bond between a metal and rubber substance to satisfy many requirements in the arts.

In prior processes for bonding rubber to metal, it has been proposed to pretreat the surface of the metal to which the rubber is to be bonded, in such a manner that the surface is roughened, as for instance by pickling the metal, sand blasting the same, or forming actual protuberances or notches around which and between which the rubber is intended to flow, thus making possible a mechanically interlocked bond between the rubber and metal. However, since the strength of the bond depends upon the extent to which the rubber and metal interlock, the effectiveness of such a physical union depends upon the kind and strength of the destructive force applied to the bonded rubber and metal article. The use of metal having a roughened surface yields somewhat better results when a cement or tie gum is applied thereto, but the bond produced is still of inferior strength because of the use of the cement. Furthermore, such methods of pretreatment for the metal surface are relatively expensive and tedious and materially increase the cost of the finished article.

It is often of great technical advantage in producing composite articles of rubber and metal wherein the rubber is to be bonded to the metal, to mold or form the rubber prior to its assembly with the metal pieces, then to assemble the rubber with a piece of metal, and finally to bond the rubber thereto. This is especially true in mass production where it is desired to form the rubber in one part of a manufacturing plant and bond it to the metal in another part thereof. In molding the rubber pieces, however, vulcanization generally occurs and in this case, the only method known heretofore of bonding such pieces subsequently to metal was the use of a tie gum, cement or adhesive. Because of the inferior nature of the bond produced with such tie gums and adhesives, the articles produced were often unsuitable for the purpose for which they were destined.

Accordingly, it is an object of the present invention to provide a process of bonding rubber or rubber-like substances to metal articles, wherein the rubber may be preformed or premolded, and vulcanized either partially or completely, prior to its assembly with the metal piece to which it is to be secured, and thereafter bonded directly to said metal piece without the use of tie gums, cements or the like.

It is an object to provide a process of the aforesaid type in which the bond produced is of such strength that it exceeds the tensile strength of the rubber itself so that upon tearing the rubber away from the metal, the failure occurs in the rubber and not in the bond; and especially to produce bonds of such reliability that the process may be used in any instance where the strength of the bond is of critical importance.

A further object is to simplify the pretreatment of the metal surfaces to which the rubber is to be secured in order to provide a superior bond of the aforesaid type, whereby substantial economies may be secured.

The basis for the present invention is the discovery that in processes wherein rubber is vulcanized in direct contact with metal surfaces, bonding between the rubber and a metal to which it may be caused to adhere directly, occurs not only during the latter stages of vulcanization, but also after vulcanization of the rubber compound is complete. This observation has led to the surprising discovery that partially vulcanized or completely vulcanized rubber can be bonded directly to a metal surface without the use of tie gums or cements.

In order to produce a composite rubber and metal article, according to the present invention, a metal piece is used, the surface of which is made of an alloy or metal to which a given rubber composition or rubber-like substance is adapted to adhere. In order to prepare the surface of the rubber-adherent metal piece to which rubber is to be bonded, the surface thereof is rendered clean, smooth, bright and continuous.

The rubber or rubber-like substance to be bonded to the metal piece is compounded in such a manner as to provide a composition adapted to adhere directly to the said metal. It is then preformed or premolded in a shape having a surface conforming substantially to those portions of the metal piece to which it is to be secured. At the same time, the mass of rubber is vulcanized, either partially or completely.

The premolded and prevulcanized rubber is then assembled with the metal piece in the desired relation and confined, for instance in a mold, the rubber being in direct contact with the metal. Sufficient pressure is applied to insure intimate contact between the metal and the rubber and sufficient heat to cause bonding of the rubber to the metal surface. In general, if the rubber has only been partially vulcanized, the heat thus applied is also utilized to complete vulcanization of the rubber. The composite rubber and metal article is then stripped from the mold by any of the usual methods.

As metals especially adapted for bonding of rubber thereto, I have found that Monel metal and cuprous alloys of the class of brass or bronze are especially suitable.

Cuprous alloys of the type of brass or bronze may contain, for instance from 60 to 85% copper, the principal remaining ingredients being tin or zinc and may also include relatively small proportions of other metals such as lead for modifying the properties of the alloy.

While "Monel" is a trade-mark, it is used herein in the sense defined by the dictionaries. That is, Monel metal is an alloy comprising approximately 67% nickel, 28% of copper and five other elements, chiefly, iron and manganese, made by the direct reduction from ore in which the constituent metals occur in these proportions. This definition is very similar to the published analysis of Monel metal as given by the exclusive producers thereof, namely, the International Nickel Corporation. The analysis given by the producers of said alloy is as follows:

| | Per cent |
|---|---|
| Nickel | 68 |
| Copper | 29 |
| Iron | 1.6 |
| Manganese | 1.0 |
| Silicon | 0.10 |
| Carbon | 1.15 |
| Sulphur | 0.005 |

Throughout the specification where I mention Monel metal, I refer to the alloy embraced within the definition given by the dictionaries and set out above. One of the more important advantages of Monel metal is that this alloy is substantially uncorrodible, and is worked as easily as other metals of the same toughness and wearing qualities.

In practicing the present invention, where practically the entire face of the metal piece is to be bonded to the rubber and the metal piece has relatively little mass, the whole metal piece may be made economically of rubber-adherent metals of the aforesaid types. Where, however, the metal piece has a great deal of mass and a comparatively small surface is to be bonded to the rubber piece, it will be found in many cases desirable to make the metal piece of a base metal such as iron, steel or the like and to secure by any of the usual methods, for instance, by welding, a layer such as a thin plate of the rubber-adherent metal to the surface of the base metal.

I have discovered contrary to expectations that in order to produce a superior bond according to the present invention between the rubber and the rubber-adherent metal, the surface of the metal must be not only clean, smooth and polished, but also continuous, i. e., the contacting surface being free from macroscopic or microscopic depressions, crevices or fissures. If this is not the case, an inferior bond is produced.

I have found, for instance not only that metal surfaces which are macroscopically roughened, as for instance by sand blasting or pickling, are unsuitable for producing superior bonds, but also that metal surfaces having microscopic depressions, crevices, or fissures are similarly unsuitable. If the nature of the metal is such that microscopic openings are present below its surface, the metal cannot be rendered suitable for direct bonding according to the present invention, by polishing alone. Such metal surfaces are, for instance those produced by electroplating or by hot spraying. Although such surfaces, especially when polished, may appear to the naked eye to be bright and continuously smooth, the minute crevices or fissures resulting from the method of their formation are present in the surface and impair the bond with the rubber substantially to the same extent as the visible depressions in surfaces of obviously rough nature.

It is believed that the reason for this effect is that air or other gases are occluded in the macroscopic or microscopic depressions of the metal surface when an attempt is made to bond the rubber thereto, holding the rubber away from the metal at these points. This results in discontinuous bonding so that the tensile strength of the bond is greatly impaired.

Thus the rubber-adherent metal forming the surface of the metal article to which the rubber composition is to be bonded must be of a continuous nature and be free of minute depressions, crevices or the like resulting from the manner in which it is produced.

As stated above, the surface of the rubber-adherent metal must also be rendered clean, smooth and bright and to this end, it is merely necessary to polish it. The polishing operation may be carried out for instance by buffing the surface of the metal on a "crocus" wheel, that is a buffing wheel having crocus martis (a form of ferric oxide) thereon as an abrasive. Since the polishing operation alone is satisfactory, in the case of rubber-adherent metals of continuous nature, for producing the superior results of the present invention, other forms of pretreatment, such as pickling, sand blasting or the like are rendered unnecessary. This results in material economy in the production of the composite rubber and metal articles.

In order to avoid the formation of a film of oxide or accumulation of dirt, the polishing of the rubber-adherent metal surface is preferably carried out directly prior to application of the rubber thereto.

The rubber pieces which are to be bonded to the rubber-adherent metal article are prepared from rubber compositions designed to adhere to the particular metal to which they are to be bonded. The nature of such compositions varies somewhat according to the kind of rubber-adherant metal used, but the nature of the compositions are in general well known in the art.

It has also been found according to the present invention that not only compositions containing natural rubber but also those prepared from synthetic rubber substances, especially of the class of butedienoid polymers such as neoprene, Duprene, chloroprene and the like can be similarly used with excellent results. Thus, in the present specification where I have mentioned rubber or rubber-like substances, I intend these terms to include all natural caoutchouc, derivatives thereof, and substitutes therefor, which are vulcanizable.

In the case of Monel metal, it has been found that the bond produced with most metal-adherent rubber compositions and various synthetic materials such as neoprene is superior to that produced with other metals.

A composition, suitable for bonding to Monel metal according to this invention, may contain the following ingredients; parts are by weight.

| | Parts |
|---|---|
| Rubber (smoked sheet) | 100 |
| Mercaptobenzothiazole | 1 |
| Petrolatum | 1 |
| Stearic acid | 1 |
| Zinc oxide | 8 |
| Whiting | 40 |
| Iron oxide | 5 |
| Sulfur | 2.5 |

The ingredients are mixed on a mill in the usual manner. The composition may be vulcanized at a mold temperature of 310° F. for a period of 10 minutes.

Numerous compositions are also known in the art as suitable for direct bonding to cuprous alloys of the type of brass or bronze.

According to the present invention, it has been found that an especially satisfactory composition yielding highly superior results with brass or bronze may be prepared by use of a quantity of smoked sheet or pale crepe, a suitable quantity of sulphur; an accelerator, especially of the mercaptoarylthiazole type, a softener of the class of higher fatty acids; and a quantity of "chemically pure" zinc oxide. The latter in conjunction with the aforesaid type of accelerator appears to be essential for the superior bonding properties of the composition.

By "chemically pure" zinc oxide is meant that which is ordinarily sold as a chemical reagent rather than for technical purposes and which is prepared by combustion of pure molten zinc metal in air or by heating zinc compounds which yield the oxide by thermal decomposition at relatively moderate temperatures, such as precipitated basic zinc carbonate or zinc nitrate. Commercial or technical zinc oxide which is that ordinarily used in rubber compositions as well as for pigmenting paints, is produced by a different method, ordinarily comprising the combustion of the vapors produced from heating a mixture of zinc ore in combination with reducing agents. Apparently, the difference between the two types of zinc oxide is a physical rather than a chemical one. It is not fully understood why "chemically pure" zinc oxide, when used in rubber compositions endows them with greatly superior bonding qualities relative to brass or bronze, as compared with similar compositions containing technical or commercial zinc oxide, but it is thought that the peculiar physical form of the "chemically pure" zinc oxide results in properties which render it more readily available for reaction with the other components of the rubber mixture and the commercial grades thereof.

In the specific composition adapted for bonding to brass or bronze by the process of the present invention, the quantity of sulphur may be from about 3 to 5 parts by weight per 100 parts of crude rubber substance, about 5 parts of sulphur being preferably used. As a vulcanization accelerator, mercaptoarylthiazole accelerators which comprise mercaptobenzothiazole, its homologues and derivatives such as for instance the zinc salts and those in which the hydrogen of the mercapto group is replaced by an organic residue, are especially satisfactory. Such compounds are designated herein as mercaptoarylthiazole accelerators. It is preferred, however, to use an accelerator of the aforesaid type wherein a mercaptobenzothiazole radical is coupled with the residue of an aromatic amine of the benzene series through the sulphur of the mercapto group by a methylene bridge which joins the mercaptobenzothiazole residue with the aromatic amino group. A preferred accelerator of this class is for instance a mixture of mercaptobenzothiazole-methylene-aniline and mercaptobenzothiazole-methylene-o-toluidine. The quantity of accelerator used may vary from about 1 to about 2 parts by weight per 100 parts of rubber substance, but preferably about 1 part of the accelerator is used.

The softeners included in the preferred composition may be higher fatty acids, such as stearic, oleic or lauric acids, but stearic acid is preferred. The quantity of higher fatty acid may vary within the reasonable limits usual in compounding rubber. About 2 to 4 parts of higher fatty acid to each 100 parts by weight of rubber substance are used, and preferably about 2 parts of stearic acid are used.

The quantity of chemically pure zinc oxide should be at least 5 parts by weight per 100 parts of crude rubber. Larger quantities may be used, but substantially the same effect is produced thereby.

The remaining components of the said composition may be selected as desired. These may comprise fillers, such as carbon black and commercial zinc oxide; additional softeners, as for instance asphaltum, pine tar and the like; and it is generally advantageous to add a suitable quantity of an antioxidant such as phenyl-betanaphthylamine in order to prevent premature aging of the rubber. Agents which increase the heat resistance of the rubber may also be used.

A suitable recipe for the aforesaid composition, in which parts are by weight, is as follows:—

|  | Parts |
|---|---|
| Rubber (smoked sheet or pale crepe) | 100 |
| Phenylbetanapthylamine | 1 |
| Stearic acid | 2 |
| Sulphur | 5 |
| Chemically pure zinc oxide | 5 |
| Mercaptobenzothiazole methylene aniline plus mercaptobenzothiazole methylene o-toluidine | 1 |
| Soft carbon black | 40 |

The above ingredients are thoroughly mixed by milling in the usual manner and calendered to a sheet of the desired thickness. This composition can be vulcanized in a mold temperature of about 310° F. for a period of about 10 to about 15 minutes at a pressure of 300 pounds per square inch.

In practicing the process of the present invention, the uncured rubber composition is preformed or premolded in a shape adapted to conform to that of the metal article to which it is to be subsequently bonded. A slug of the rubber composition is placed in the mold or form and confined under pressure. Heat is applied to render the mass plastic so that it acquires the form in the mold, and the heat is continued for a sufficient period to partially or preferably to completely vulcanize the rubber. The mold is then opened, the rubber article removed, and assembled in the desired relation with the metal piece having a surface of rubber-adherent metal to which it is to be bonded, the metal piece having been previously prepared, as described above, by polishing to give it a smooth, clean continuous polished surface.

Sufficient pressure is then applied, preferably perpendicular to the contact surface of the rubber and metal to maintain intimate contact at the rubber-metal interface and in such a manner as to prevent distortion of the rubber. The assembled article is preferably confined, for instance by placing it in a mold which fits snugly around the rubber portions and the contiguous exposed metal surfaces thereof. Suitable means is provided for maintaining pressure at the rubber-metal interface throughout the bonding operation.

Any pressure which is sufficient to maintain an intimate substantial pressure contact at the rubber-metal interface throughout the bonding operation may be used, but relatively high pressures are preferably applied, and accordingly, the rubber is so confined as to prevent lateral movement thereof with respect to the rubber-adherent metal surface.

Heat is applied in such a manner that the metal and rubber are raised to a temperature sufficient to cause the rubber to bond to the metal. Such temperatures are generally comparable with those required for vulcanization of the rubber compounds suitable for use in the present procedure. For instance, temperatures from 300 to 320° F. have been found satisfactory in the case of the rubber composition adapted for use with brass disclosed above, as well as for the specific composition adapted for use with Monel metal. As a result, if the rubber is only partially vulcanized prior to its assembly with the metal, vulcanization is completed in the present process. The duration of the heating varies according to the composition of the rubber and the metal used. For example in the case of rubber compositions which are completely vulcanized before assembly with a metal, heating from 3 to 10 minutes, preferably for about 5 minutes, was found sufficient to effect the formation of the desired bond. In the case of partially vulcanized rubber, the time for heating is generally increased by a period sufficient to effect complete vulcanization. From about 3 to about 15 minutes is generally satisfactory. When the bonding is complete, the pressure is released, the composite rubber and metal article removed from the mold and allowed to cool.

In the accompanying drawing, several articles are shown by way of illustration which may be produced according to the present process.

Figs. 1 and 2 show tire valve stems partially in cross-section having a tubular metal insert bonded to a rubber base.

Fig. 3 shows a cross-section of a rubber-like metal tube.

Fig. 4 shows in cross-section a rubber layer bonded to a metal plate.

Fig. 5 shows partially in cross-section a metal rod secured in a rubber sleeve surrounded by a sleeve of metal.

Fig. 6 shows in cross-section a mold adapted for use in forming a rubber and metal article wherein the rubber may be vulcanized and molded separately from the metal and subsequently bonded thereto.

Fig. 7 is a view similar to Fig. 6 showing the same mold during bonding of the premolded rubber piece to a metal piece.

Fig. 8 is a plan view of another composite article with part of the rubber substance omitted to show the way the metal may be formed so that the area of the bond between the rubber and the metal is reduced.

In order to produce the valve stems shown in Figs. 1 and 2, the rubber bases 10 and 11 are premolded and vulcanized. In order that a substantial pressure may be conveniently applied at the rubber-metal interface between metal inserts 12 and 13 and rubber bases 10 and 11, the inside diameter of the rubber sleeves 14 and 15 into which the metal inserts 12 and 13 fit is made slightly smaller than the outside diameter of the metal inserts. The latter are made of a rubber-adherent metal adapted to be bonded to the composition of the rubber bases 10 and 11 and their surfaces polished until they are smooth and bright, and are of a continuous nature. The inserts are then inserted into the rubber bases as shown, and the articles positioned in a mold adapted to confine the rubber. The mold is closed and sufficient pressure applied to the rubber to maintain a substantial positive pressure at the rubber-metal interface. The contents of the mold is heated until bonding occurs between the rubber and the metal, and the valve stem thereafter is stripped from the mold.

Referring to Fig. 3, the tubular rubber lining 18 is premolded and vulcanized. Its outside diameter is preferably made slightly larger than the inside diameter of the metal sleeve 17 to which it is to be bonded. The sleeve 17 is constructed of a metal such as Monel metal or brass, having a continuous surface, to which the rubber composition is adapted to be directly bonded, and its inner surface rendered clean, smooth and bright by polishing. The rubber lining 18 is inserted into the bore of the sleeve 17 and the composite article placed in a mold having a core pin adapted to fit into the axial bore 16 of the rubber mass 18. On closing the mold, pressure is applied to the surfaces 19 and 20 of the rubber mass, whereby positive pressure is maintained at the rubber-metal interface and supported by the pin extending through the bore of the rubber mass 18. Upon application of heat, the rubber is securely bonded to the inner surface of the sleeve. If desired, the rubber lining 18 may be premolded to have the same outside diameter as the inside diameter of the sleeve 17, but the bore 16 may be made slightly smaller than the core pin of the mold in which bonding is to be effected. Closure of the mold thereby causes pressure to be applied at the rubber-metal interface by compression of the rubber between the oversized pin and the inner surface of the metal sleeve, said pressure being supported by the mold confining the ends 19 and 20 of the rubber mass.

In order to bond the rubber layer 21 to the surface of the plate 22, as shown in Fig. 4, the rubber 21 is premolded and vulcanized in the desired form from a composition compounded to have metal-adherent qualities, brought into contact with the metal plate 22 of rubber-adherent metal, the surface of which is continuous, and polished to render it smooth and clean. Pressure is applied, tending to confine the rubber and force it against the surface of the plate, and the temperature is raised to cause bonding of the rubber to the metal surface.

In order to make the rubber-metal article shown in Fig. 5, a tubular rubber mass 23 may be premolded and vulcanized to have an outside diameter slightly larger than the inside diameter of the cup-like metal sleeve 24; or the central bore of the rubber mass 23 which is to receive the metal rod 25 may be constructed slightly smaller than the outside diameter of said metal rod. The rubber mass is inserted into the sleeve 24 and the rod 25 into the central bore of the rubber. Intimate contact is maintained between the metal surfaces and the rubber mass by the oversized construction of the rubber or of the rod 25. Application of pressure at the surface 26 of the rubber confines it within the sleeve and causes positive pressure to be maintained at the rubber-metal contact surfaces. The temperature is raised sufficiently to bond the rubber to the metal, resulting in the formation of a composite rubber-metal article in which the metal is securely bonded to the rubber.

According to the structure illustrated in Figs. 6 and 7, one half 32 of the mold may be provided with cavities 36 for shaping rubber pieces, while the other half 33 of the mold may contain cavities 38 for receiving metal pieces 34. Between the two molds, a plate or platen 35 may be initially inserted, on which pieces of unvulcanized rubber, compounded to adhere to a metal-adherent surface are then placed under the cavities 36 in the part 32 of the mold. The parts of the mold are brought together under heat and pressure as illustrated in Fig. 6, and the rubber pieces 37 are formed and vulcanized either completely or partially, depending upon the length of time they are subjected to the vulcanizing action. When this has been done, the platen 35 is withdrawn from between the parts 32 and 33 of the mold and the metal pieces 34 inserted in the cavities 38 in the part 33 of the mold if they were not already placed there before the molding operation began.

When the platen 35 is withdrawn from the mold parts, any flash formed by the molding of the rubber pieces 37 that will adhere to the platen 35 will be carried away with the platen to be scraped off later. The parts 32 and 33, one containing the precured or semicured rubber pieces 37, and the other containing the metal pieces 34 having a rubber-adherent metal surface, are brought together under heat and pressure to bond the rubber to the metal.

When the bonding operation is completed, and the mold separated, the metal and rubber pieces being now united may be removed from the mold as a composite article by any suitable stripping means. The practice of the method just described and the apparatus used therefor avoids the necessity of stripping the premolded rubber pieces from the mold and replacing them in another mold to be bonded to the metal pieces.

The hereinbefore described process can be applied for bonding a plurality of metal pieces to the same mass of rubber, whereby the rubber forms a link between the various metal pieces, or several pieces of rubber may be bonded to the same piece of metal, whereby the latter forms a bridge between the various rubber parts. Moreover, if it is desired, additional pieces of rubber may be secured by any of the well-known methods, for instance by vulcanizing, to a mass of rubber secured to the metal article by the above-described methods.

One of the more important features of this invention is that the metal and rubber may be bonded together by processes similar to the process of vulcanizing rubber, and the same apparatus, used for molding and vulcanizing rubber, may be used in the present case.

Contrary to expectations on the basis of the prior art, I have discovered that roughening or serrating the surfaces of the rubber-adherent metal prior to the application of a premolded, prevulcanized metal-adherent rubber composition thereto reduces the union between the rubber and metal to such an extent, when it is subjected to heat and pressure, that only a partial or very inferior bond is produced. Thus, when it is desired to reduce the bond between the rubber-adherent metal surface and that of rubber bonded thereto, it is merely necessary to provide grooves on the surface or otherwise roughen it locally before bringing the surface of the metal and the rubber substance into direct contact. If this is done solely on a portion of the metal surface contacting the rubber, while the remainder of the said surface is continuous, smooth, clean and polished, the bond will occur only at the latter portions, no secure bond being obtained where the metal is roughened. A surface of this type is illustrated in Fig. 8, wherein roughened grooves 39 are provided on the surface of a rubber-adherent metal 40 to which a mass of rubber 41 is to be bonded according to the present invention. The remainder of the surface 42 is continuous, smooth and polished. When the rubber is bonded according to the present process, secure bonding occurs only at the portions 42 of the said surface, while at the portions 39 substantially no bonding in the sense used herein is produced.

Variations and modifications may be made within the scope of this invention and portions of the improvements may be used without others.

I claim:

1. The art of bonding a completely cured metal-adherent rubber composition directly to a cuprous alloy article of the class consisting of brass and bronze articles, comprising the steps of providing said cuprous alloy article with a clean, continuously smooth polished surface; bringing an untreated surface of the cured rubber composition into direct contact with said polished cuprous alloy surface; maintaining sufficient pressure at the rubber-metal interface to insure intimate contact between the rubber and the cuprous alloy; and applying sufficient heat to cause the rubber to adhere to said alloy surface.

2. The art of bonding a partially cured metal-adherent rubber composition directly to a cuprous alloy article of the class consisting of brass and bronze articles, comprising the steps of providing said cuprous alloy article with a clean, continuously smooth polished surface; bringing an untreated surface of the partly cured rubber composition into direct contact with said polished cuprous alloy surface; maintaining sufficient pressure at the rubber-metal interface to insure intimate contact between the rubber and the cuprous alloy; and applying sufficient heat to completely cure the rubber, and to cause the rubber to adhere to said alloy surface.

3. A method of forming a composite rubber and metal article wherein the rubber is securely bonded directly to the surface of a cuprous alloy article of the class consisting of brass and bronze articles, which comprises compounding a rubber composition to contain, in addition to a suitable quantity of a crude rubber substance, a suitable portion of sulphur, a mercapto-aryl-thiazole accelerator, stearic acid as a softener, and a proportion of chemically pure zinc oxide; prevulcanizing a quantity of said compound in the desired shape; placing an untreated surface of the prevulcanized rubber compound and a cuprous alloy article of the class consisting of brass and bronze articles having a continuously smooth, clean, polished surface in a mold; applying sufficient pressure to maintain intimate contact at the rubber-metal interface; and applying sufficient heat to cause bonding of the rubber to the surface of the metal article.

4. A method of forming a composite rubber and metal article wherein the rubber is securely bonded directly to the surface of a cuprous alloy article of the class consisting of brass and bronze articles, which comprises compounding a rubber composition to contain, in addition to a suitable quantity of a crude rubber substance, a suitable proportion of sulphur, a mercapto-aryl-thiazole accelerator, stearic acid as a softener, and a proportion of chemically pure zinc oxide; prevulcanizing a quantity of said compound in the desired shape; polishing the surface of a cuprous alloy article of the class consisting of brass and bronze articles; placing said cuprous alloy article and an untreated surface of the mass of prevulcanized rubber in a mold; applying sufficient pressure to the mold to maintain a pressure of at least 300 pounds per square inch at the contact surface of the rubber with the cuprous alloy article; and heating at a temperature of from 300 to 320° F., until the rubber is bonded to the polished surface of the cuprous alloy article.

5. In the art of bonding a metal-adherent rubber substance, compounded to be directly bondable to metal, to a smooth, polished and continuous rubber-adherent surface of a cuprous alloy of the class consisting of bronze or brass to which said rubber substance is adapted to be bonded directly, the steps which comprise prevulcanizing a mass of said rubber substance; bringing an untreated surface of said prevulcanized mass of rubber substance into direct contact with said rubber-adherent surface; and subjecting the rubber substance and alloy to heat and pressure sufficient to cause cohesion between the contacting areas of said rubber substance and surface.

6. The art of bonding a metal-adherent rubber substance directly to a smooth, polished and continuous rubber-adherent surface of a cuprous alloy of the class consisting of bronze or brass, which comprises partly curing said rubber substance; bringing an untreated surface of the partly cured rubber substance into direct contact with said rubber-adherent surface; and subjecting the rubber substance and alloy to sufficient heat and pressure to completely cure said rubber substance and to cause the latter to cohere to the areas of said rubber-adherent surface in contact therewith.

7. The art of bonding a metal-adherent rubber substance directly to a smooth, polished and continuous rubber-adherent metal surface, which comprises bringing an untreated surface of a material of a class consisting of cured and partially cured substance into direct contact with said rubber-adherent surface of a cuprous alloy of the class consisting of bronze or brass; and subjecting the rubber substance and alloy to heat and pressure sufficient to cause cohesion between the contacting areas of said rubber substance and rubber-adhering surface.

8. In the art of bonding a metal-adherent rubber substance, compounded to be directly bondable to metal, to a rubber-adherent alloy of the class consisting of brass and bronze to which said rubber substance is adapted to be bonded directly, the steps which comprise providing said alloy with a clean, bright, continuously smooth polished surface; prevulcanizing said rubber substance; placing an untreated surface of said prevulcanized rubber substance in direct contact with said polished rubber-adherent alloy surface; and subjecting the rubber substance and alloy to heat and pressure sufficient to cause cohesion between the contacting areas of said rubber substance and the polished surface of the rubber-adherent alloy.

9. In the art of making composite rubber and metal articles in which the rubber is securely bonded directly to the metal, the steps which comprise prevulcanizing a mass of directly metal-adherent rubber substance; applying a piece of a rubber-adherent alloy of the class consisting of brass and bronze having a smooth, polished and continuous surface to which said rubber is adapted to be directly bonded, in surface contact with an untreated surface of said rubber substance; and applying sufficient heat and pressure to said alloy piece and rubber substance to cause cohesion between the contacting areas of the rubber and alloy.

10. In the art of making a composite rubber and metal article, the steps which comprise prevulcanizing a mass of a directly metal-adherent rubber substance; securing a thin continuous layer of a rubber-adherent alloy of the class consisting of brass and bronze to which said rubber substance is adapted to be directly bonded, to the surface of a metal piece to which the rubber is to be bonded; polishing said rubber-adherent alloy layer to render it continuously smooth, clean and bright; bringing an untreated surface of said prevulcanized mass of rubber into direct contact with the polished surface of said rubber-adherent alloy layer; and subjecting the rubber substance and metal to heat and pressure sufficient to cause cohesion between the contacting areas of said rubber substance and the polished layer of rubber-adherent alloy.

11. In a method of forming a composite and rubber-metal article wherein the rubber is securely bonded directly to the surface of a metal piece, the steps which comprise prevulcanizing a mass of a rubber composition adapted to cohere directly to the metal of said article in the desired shape; placing said mass of prevulcanized rubber composition and a piece of metal, having a smooth, polished and continuous surface of a cuprous alloy of the class consisting of bronze or brass to which said rubber composition is adapted to cohere directly, in a mold adapted to confine the rubber mass against distortion, an untreated surface of said rubber mass being in direct contact with said alloy surface; applying sufficient pressure to the mold to maintain intimate contact between the surface of the metal piece and the prevulcanized rubber composition; and applying sufficient heat to cause bonding of the rubber to the alloy surface of said metal piece.

12. In a method of forming a composite rubber and metal article wherein the rubber is securely bonded to the surface of a metal piece, the steps which comprise prevulcanizing a mass of a rubber composition adapted to cohere directly to the metal of said article, in the desired shape; placing said mass of prevulcanized rubber composition and a piece of metal, having a smooth, polished and continuous surface of a cuprous alloy of the class consisting of bronze or brass to which said rubber composition is adapted to cohere directly, in a mold adapted to confine the rubber mass against distortion, an untreated surface of said rubber mass being in direct contact with said alloy surface; applying sufficient pressure to the mold to maintain a substantial positive pressure at the contact surface of the metal piece with the prevulcanized rubber composition substantially perpendicular to said contact surface; and applying sufficient heat to cause bonding of the rubber to the surface of said metal piece.

13. In a method of forming a composite rubber and metal article, wherein the rubber is securely bonded directly to the surface of a metal piece, the steps which comprise prevulcanizing a mass of a rubber composition adapted to cohere directly to the metal surface of said metal piece, in the desired shape; placing said mass of prevulcanized rubber composition and a piece of metal having a smooth, polished and continuous surface of a cuprous alloy of the class consisting of bronze or brass to which said rubber composition is adapted to cohere directly, in a mold adapted to confine the rubber against distortion, with an untreated surface of the rubber composition in direct contact with said rubber-adherent surface; applying sufficient pressure to the mold to maintain a substantial positive pressure at the contact surface of the metal piece and the mass of prevulcanized rubber composition; and heating the contents of the mold at a temperature of the same order as that required to vulcanize the rubber until the rubber is bonded to the rubber-adherent surface of the article.

14. In a process of forming a composite article of metal and rubber substance, the steps which comprise premolding and precuring a body of a rubber substance, compounded to cohere directly to a rubber-adherent metal, in the desired shape; exposing one surface of the molded rubber without stripping the rubber from the mold; applying an alloy piece of the class consisting of bronze and brass having a continuously smooth clean polished surface of the said alloy to which the said rubber substance is adapted to cohere directly, to the untreated exposed surface of the molded rubber substance, the polished surface of said alloy forming direct contact with the exposed rubber substance; reclosing the mold; and applying sufficient heat and pressure to bond the rubber directly to said alloy surface.

15. In a method of making a composite rubber and metal article wherein the rubber portion is securely bonded directly to the surface of a metal piece, the steps which comprise preforming and at least partially prevulcanizing said rubber portion from a metal-adherent rubber composition, adapted to be bonded directly to metal; assembling said preformed rubber portion with an untreated surface in the desired relation with a piece of metal of the desired shape having a smooth, polished and continuous surface of a cuprous alloy of the class consisting of bronze or brass to which said rubber composition is adapted to be directly bonded, the rubber being in direct contact with said surface; and applying sufficient heat to bond the rubber to the metal while maintaining a substantial pressure at the rubber-metal interface throughout the bonding operation to insure intimate pressure contact between the rubber and the surface.

16. In a method of making a composite rubber and metal article wherein the rubber portion is securely bonded directly to the surface of a metal piece, the steps which comprise preforming and precuring said rubber portion from a metal-adherent rubber composition adapted to be directly bonded to metal; providing a piece of metal of the desired shape with a continuously smooth clean polished surface of an alloy of the class consisting of bronze and brass to which the said rubber composition is adapted to cohere directly; assembling said preformed rubber portion in the desired relation with said rubber-adherent surface with an untreated surface of the rubber in direct contact with said surface; and applying sufficient head to bond the rubber to the surface while maintaining a substantial pressure at the interface throughout the bonding operation to insure intimate pressure contact between the rubber and the rubber-adherent surface.

17. In a method of forming a composite rubber and metal article wherein the rubber is securely bonded directly to the surface of a metal piece, the steps which comprise preforming and at least partially prevulcanizing a rubber composition adapted to be adhered to the surface of the said metal piece in the desired shape; placing said preformed rubber composition and said metal piece, having a smooth, polished and continuous rubber-adherent surface of a cuprous alloy of the class consisting of bronze or brass to which said rubber composition is adapted to cohere directly, in a mold adapted to confine the preformed rubber against distortion, an untreated surface of said rubber being in direct contact with said rubber-adherent surface, applying sufficient pressure to the mold to maintain intimate contact between the said surface of the piece and the preformed rubber composition; and applying sufficient heat to cause bonding of the rubber to the surface of the metal article, said heat being at least sufficient to completely vulcanize the rubber.

OAKLEY W. HOSKING.